United States Patent [19]

Williams et al.

[11] Patent Number: 4,978,852

[45] Date of Patent: Dec. 18, 1990

[54] HADAMARD TRANSFORM MEASUREMENT OF MSN FOURIER-TRANSFORM MASS SPECTRA

[75] Inventors: Evan R. Williams, Palo Alto, Calif.; Fred W. McLafferty, Ithaca, N.Y.

[73] Assignee: Cornell Research Foundation, Inc., Ithaca, N.Y.

[21] Appl. No.: 500,483

[22] Filed: Mar. 28, 1990

Related U.S. Application Data

[63] Continuation-in-part of Ser. No. 241,869, Sep. 8, 1988, Pat. No. 4,931,639.

[51] Int. Cl.$^5$ ...................... H01V 49/00; B01D 59/44

[52] U.S. Cl. .................................. 250/282; 250/291; 436/173

[58] Field of Search ...................... 250/282, 291, 281; 436/173

[56] References Cited

U.S. PATENT DOCUMENTS 4,931,639 6/1990 McLafferty ........................ 250/282

OTHER PUBLICATIONS

McLafferty et al., Analytical Chemistry, 59, 1987, pp. 2212-2213.

McLafferty et al., International Journal of Mass Spectrometry and Ion Processes, 72 (1986), pp. 85-91.

*Primary Examiner*—Jack I. Berman

*Attorney, Agent, or Firm*—Jones, Tullar & Cooper

[57] ABSTRACT

The simultaneous collection of multiple spectra using tandem and multidimensional mass spectrometry from multiple precursors yields correspondingly enhanced sensitivity through Hadamard transform deconvolution. For $MS^n$ spectra, the product relationships are coded by a Hadamard differences method wherein the combined daughter spectrum of a selected half of the precursors is subtracted from the combined daughter spectrum of the remaining precursors, so that no ions are lost.

7 Claims, 8 Drawing Sheets

Hadamard Transform (1,0) for MS/MS

Hadamard Transform (1,0) for MS/MS/MS

HADAMARD TRANSFORM MEASUREMENT OF MSN FOURIER-TRANSFORM MASS SPECTRA

This application is a continuation-in-part of application Ser. No. 07/241,869, filed Sept. 8, 1988 and entitled "Multiplication Measurement of Ion Mass Spectra", now U.S. Pat. No. 4,931,639 the disclosure of which is hereby incorporated herein by reference.

BACKGROUND OF THE INVENTION

This invention was made with Government support under Grants Numbers CHE-8616907 and CHE-8620293 awarded by the National Science Foundation and under Grant Number GM-16609 awarded by the National Institutes of Health. The Government has certain rights in the invention.

The present invention relates, in general, to a method for enhancing the sensitivity of mass spectrometry, and more particularly, to a method of mass analysis of molecular samples utilizing Hadamard transform differences to obtain improved signal to noise ratios and increased accuracy and reliability in sample analysis.

The identification of compounds in complex mixtures and the structural elucidation of large molecules present difficult challenges in chemical analysis. Tandem mass spectrometry, or MS/MS, which involves the characterization of individual primary ions of a normal mass spectrum through their secondary product ions, greatly increases the information available from a sample, and is widely used for solving difficult problems of identifying trace components in complex mixtures. However, in conventional tandem mass spectrometry, the analysis of a sample material having many components is hampered by the great loss in sensitivity encountered when the spectrum of each precursor must be measured individually while discarding the precursor ions of all other precursor components. When analysis time or sample quantity is limited, the use of this technique may be limited to just a few precursors. $MS^n$ spectra in which mass-selected products are dissociated to produce further spectra, present an even greater measurement problem, since the number of possible dissociation or reaction pathways increases exponentially with n.

In conventional mass spectrometry, only a single primary ion from the sample is selected at one time for analysis, and any nonselected ions in the sample are lost. In order to analyze the sample completely, the mass selection of primary ions by conventional spectrometers is varied as a function of time so that (for example) higher and higher masses are selected for measurement of their secondary mass spectra. Over a period of time, all of the constituent ions are selected in sequence, and the entire primary spectrum of the target is covered, but this is time consuming and wasteful of energy and material.

When a Fourier transform technique is applied to a large number of components, the technique is hampered by a large loss of sensitivity, for when the selected precursors are measured individually, the precursor ions of other components are discarded. When the analysis time or the sample quantity is limited, such as is the case for on-line trace analysis for toxic substances in incinerator exhaust, peptide sequencing, etc., the use of this technique becomes limited to just a few precursors. In cases in which mass-selected products are then dissociated to produce even further spectra, an even greater measurement problem is encountered, since the number of possible dissociation or reaction pathways increases exponentially.

An improvement of this procedure involves the use of a two-dimensional Fourier transform mass spectrometry (FTMS), which can be used to measure simultaneously all of the parent and daughter ions which are selected, resulting in enhanced sensitivity for the collection of mass spectra. The multichannel detection capability of FTMS makes possible the collection of a complete secondary ion spectrum of a single parent ion, with nearly the same efficiency as the detection of a single one of the secondary ions. For example, as described by P. Pfandler et al in Chem. Phys. Lett. 1987, Vol. 138, pp. 195–200 and in Journal of Am. chem. Soc. 1988, Vol. 110, pp. 5625–5628, ions in an ion cyclotron resonance mass spectrometer are initially excited by RF energy to place precursor ions into cyclotron orbits wherein the frequencies of the orbits are functions of ion mass. A de-excitation RF pulse is applied after a specific delay time $t_1$ to change the effective abundance of specific precursor ions as a function of the phase difference, which is dependent on the precursor mass to charge ratio (m/z value). Secondary mass spectra are then recorded as a function of $t_1$ and the Fourier transform of this function for a specific mass peak then shows the abundance originating from each precursor. The major limitation of the Pfandler et al two-dimensional FTMS technique is that high resolution selection of parent ions which are present over a wide mass range requires very large numbers of MS-II spectra to provide sufficient resolution in determining which daughters come from their corresponding parent. This method has been demonstrated for larger ions, but never with parent ions separated by more than few Daltons, thereby seriously limiting any practical applications.

In accordance with the invention described in U.S. Ser. No. 07/241,869, molecular samples are measured through the use of a Hadamard transform wherein primary gaseous ions are produced from a molecular sample and different combinations of one half of those primary (or precursor) ions are selected. The selected primary ions are reacted, for example, by collisionally activated dissociation, to obtain from each of the primary ions a multiplicity of secondary, or daughter ions, of masses different than the masses of their precursor ions. The secondary ions are then separated in accordance with their masses and the abundances of the secondary ions are measured to obtain a mass spectrum of the secondary ions. This process is repeated to select different combinations of each primary ions, each time selecting one-half the total number of precursor ions, with the process being repeated the same number of times as there are primary ions. Upon completion of that process, the abundance of each secondary ion arising from the reaction of each primary ion is calculated by analyzing, through the use of the Hadamard transform, the yields of secondary ions from each combination of primary ions. Based on these yields, the constituents of the molecular sample can be identified with considerable accuracy and reliability. This reliability is enhanced by the fact that the repetitive measurements of different combinations of primary ions enhance the signal-to-noise ratio, allowing a gain of $n^{0.5}/2$ in measuring n primary ions, as compared to other techniques of analysis.

The invention described in Ser. No. 07/241,869, is an improvement over prior Fourier transform methods, for with the described Hadamard transform method only half of the precursor ions must be discarded in the course of a measurement, with the other half being selected, dissociated simultaneously, and the spectrum of the combined products measured. Thus, for example, if there are n primary ions, n/2 of these ions are selected. The selected primary ions are dissociated as by means of a collisionally activated dissociation reaction and the secondary ions are then mass-separated by means of a second stage of mass spectrometry. This process is then repeated for another combination of primary ions, again selecting a different n/2 ions and the mass yields are again obtained. This process is repeated a total of n times, each time selecting a different combination of primary ions. The abundance of a specific mass peak in a spectrum represents the sum of contributions from each precursor used; thus, each individual precursor contribution can be calculated using the corresponding abundance values from the n combined spectra, solving n simultaneous equations for n unknowns, with the process being repeated for each specific mass peak.

The Hadamard method described in Ser. No. 07/241,869 requires the use of instruments which have the ability to select and simultaneously dissociate any combination of precursor ions. This ability is an advantage of ion trap and Fourier-transform mass spectrometry which has received little attention in the past. FTMS also has the further advantage of multiple precursor selection at high resolution over a wide mass range using stored wave form inverse Fourier-transform (SWIFT) excitation as described by L. Chen et al in *Analytical Chemistry* 1987, 59, pp. 449–454 and by A.G. Marshall et al in *Fourier Transform Mass Spectrometry;* M.V. Buchanan, editor, American Chemical Society Symposium Series, No. 359; Washington, D.C. 1987; pp. 21–33. Such on/off selection of precursors for multichannel dissociation provides the information relating precursors to their corresponding daughters in each of the series of combined MS-II spectra for the Hadamard transform method. Precursor modulation for this purpose utilizes a sine function for the Fourier transform method. However, in both the Hadamard transform and the Fourier transform methods, the on/off or the sine function modulation of the precursors results in the loss of approximately one-half the detector signal.

SUMMARY OF THE INVENTION

The present invention is directed to an improved Hadamard method for use with tandem (MS/MS) and multidimensional (MS/MS/MS) mass spectrometry (generally referred to as $MS^n$, where n is the number of stages of mass spectrometry) in which no ions are lost in the encoding step. Thus, the present invention utilizes an improved Hadamard technique in which the combined daughter spectrum of the selected half of the precursors is subtracted from the combined daughter spectrum of the other half of the precursors, as by multiplying each channel by +1 or −1 and then solving simultaneous equations.

It is known that Hadamard multiplexing, when applied to optical instruments, uses a mask to modulate the source intensity for each wavelength channel, either transmitting or blocking its contribution to the total light signal. Thus, the signal from each channel is multiplied by either a +1 or a 0, respectively, and is so represented in the Hadamard array. Because each channel is blocked approximately half the time, one-half the total signal to the detector is lost in order to achieve the required encoding. If however, instead of blocking the light the mask reflects it to a second detector, effectively multiplying each channel by a +1 (transmitted) or a −1 (reflected), then no signal is discarded. The individual signals from each of p channels can be calculated by solving p simultaneous equations with coefficients of +1 or −1. Thus, the time saved by this technique, as opposed to measuring each channel individually, is p and the signal to noise (s/n) gain is $p^{0.5}$.

This technique of multiplying each of two channels by +1 or −1, which may be referred to as a Hadamard of differences technique, is applied to the analysis of samples in mass spectrometry in accordance with the present invention. In an MS/MS analysis, this is carried out through a separate dissociation of two precursor sets, and mass analysis of the dissociated products. This may be implemented, for example, in a dual cell Fourier transform mass spectrometer by forming and partitioning the precursor ions between the two cells, dissociating the ions in separate channels, using a quadrature spectrum measurement to encode phase information necessary to produce negative as well as positive signals, and then subtracting the signals produced by one cell from those produced by the other. In one form of the invention, a ring electrode is provided around the conductance limit opening between the cells of a dual cell FTMS. Half of the precursor ions are selectively excited to orbits large enough to keep these ions trapped by the cell end plate outside the ring electrode, while the remaining precursor ions are selectively transferred to the second cell by momentarily grounding this electrode. The precursors in the first cell are collisionally relaxed back to the cell center, which process is especially effective for large ions. Alternatively, the precursors can be returned to the cell center electrostatically by applying a voltage pulse to the excite and receive (X, Y) plates, followed by collisional relaxation of the resulting Z-axis excitation.

The precursor ions in both cells of the dual cell FTMS are then dissociated and the daughter ions so produced are measured. Daughter ion measurements in each of the two cells utilize excitation waveforms shifted in phase by 180°. This may be accomplished, for example, by reversing the electrical connections to the excitation plates of one cell. The daughter ions in both cells are detected with the resulting signal for a particular m/z value representing the difference (+ or −) between the abundances of each cell. As a result, none of the ions from the sample to be measured are discarded.

In the case where precursor and daughter ions have similar m/z values, as may be encountered with electrospray ionization, an even simpler approach than that described above can be used. If a linear precursor has, for example, 100 evenly spaced charges, a random fragmentation of the precursor will produce two daughter ions of nearly the m/z value of the precursor. Two selected sets of precursors are then simultaneously excited, but with opposite phase, and then are immediately dissociated, as by photodissociation, so that daughters of the two sets will be formed on opposite sides of the FTMS cell. These daughter ions would then continue in orbit with their characteristic frequencies, but through quadrature detection, those of a particular frequency and m/z value from the two sets would make amplitude contributions in the detector of opposite signs. This technique can be used, for example, immediately after the dual cell method described above, to thereby give MS/MS/MS information without discarding ions. This could also be accomplished for ions having a large range of m/z values through the use of a four-cell arrangement. Thus, MS II spectra of 100 precursors would be collected in 1/100th the time (and with 1/100th the sample) required for measurement of those precursors individually. Similarly, 100 MS-III spectra obtained from dissociating 10 daughters of 10 precursors could also be collected in 1/100th the time.

This Hadamard of differences technique is generally applicable to any mass spectrometer capable of selecting and dissociating multiple precursors and analyzing their products, such as the ion trap or reflectron time of flight spectrometer. In the ion trap, multiple parent ions can be selectively retained and dissociated using appropriate RF frequencies, analogous to the FTMS method discussed above. In reflectron time of flight (RTOF) different combinations of parents can be selected by removing all others by the use of a pulsed retarding grid, with these ions made to undergo photodissociation or surface-induced dissociation in the reflectron lens assembly.

In prior $MS^n$ methods, the possible gain in the signal to noise ratio is reduced with increasing n, since in each additional step, one-half of the ions available for dissociation must be discarded. The Hadamard differences method of the present invention avoids these losses so that all possible $MS^n$ spectra can be collected, with the signal to noise for each collection being equivalent to that which could be obtained by the same number of repeated measurements of the individual spectrum, but in much less time. This more efficient collection of $MS^n$ spectra increases the potential for analytical applications, such as the analysis for numerous targeted compounds in highly complex mixtures. In addition, the Hadamard transform differences method enhances the utility of $MS^n$ for large molecules such as peptides, especially those in mixtures. For example, molecular ions from a mixture of two peptides, each with 1,000 amino acids, could be dissociated, with each peptide producing about 75 fragment ions consisting of 10 to 20 amino acids. The corresponding 150 MS-III spectra, determined simultaneously, would then provide extensive sequence information on the peptide's fragments. Their sequences would indicate those of the original two peptides to the extent to which the fragments represent the total structure and to the extent to which the information on their overlaps is unique. The Hadamard differences method provides the same signal to noise for any one of these MS-III spectra measured simultaneously with all 150 as could be obtained by measuring one individually with the same amount of sample.

BRIEF DESCRIPTION OF THE DRAWINGS

The foregoing, and additional objects, features, and advantages of the present invention will be apparent to those of skill in the art from a consideration of the following detailed description of a preferred embodiment thereof, taken in conjunction with the accompanying drawings, in which.

DESCRIPTION OF PREFERRED EMBODIMENTS

Figure 1:
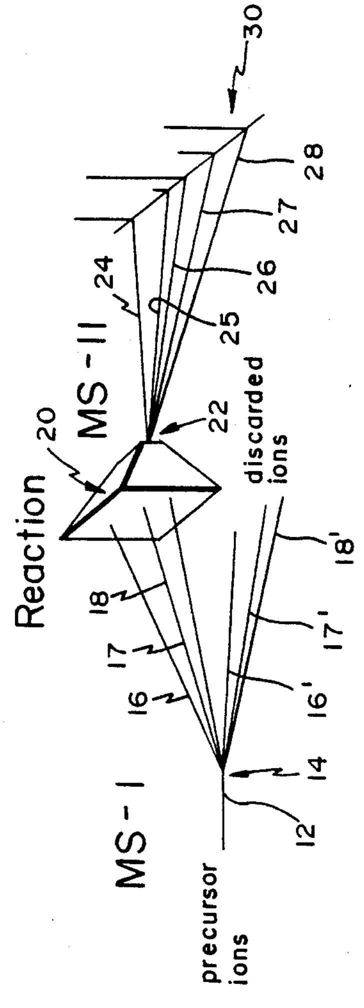
FIG. 1 (PRIOR ART)
FIG. 1 is a diagrammatic illustration of a two-stage (MS-II) method of sample analysis using the Hadamard transform.

Referring now to FIG. 1 there is illustrated generally at 10 in diagrammatic form a Fourier transform tandem mass spectrometer wherein a mixture 12 of ions to be analyzed is separated by mass into a multiplicity of primary ions, as indicated at 14. In accordance with the system described in the aforesaid application Ser. No. 07/241,869, the spectrometer 10 is energized to mass-select those ions which are to be analyzed, which ions are indicated by the exemplary lines 16, 17 and 18, with the remaining ions being discarded, as indicated at 16′, 17′ and 18; the spectrometer thereby serving as a first mask for the system. In accordance with the aforesaid application, this first stage MS-I of the spectrometer 10 selects about 50% of the ions from mixture 12, with the ions of each mass value so selected travelling along corresponding paths such as those indicated at 16, 17 and 18 in the spectrometer. After separation, the selected primary ions are dissociated or reacted, as by collisionally activated dissociation (CAD) indicated at 20, to produce a second stage multiplicity of secondary ions within the spectrometer 10.

The secondary, or daughter, ions produced by the dissociation reaction of the precursor primary ions are separated by a second stage (MS-II) of the mass spectrometer 10, as diagrammatically indicated at 22 to produce ion streams 24–28. Although the second stage MS-II is illustrated in FIG. 1 as being separated in space from the first stage MS-I, it will be understood that FIG. I illustrates a conventional Fourier transform mass spectrometer wherein the stages are separated in time to mass-select those secondary ions. Thus, the mass-selected ions on paths 16, 17 and 18 are dissociated at 20 and are again mass-selected at MS-II into a plurality of secondary paths schematically represented at 24, 25, 26, 27 and 28, the exact number of paths in each group depending upon the number of different mass values by the spectrometer at stages MS-I and MS-II. The streams of secondary ions illustrated on paths 24 to 28 represent the masses of secondary ions over as wide a mass range as desired. These secondary ions travel in their cyclotron orbits within the spectrometer 10, and a complete mass spectrum is obtained using the Fourier transform of the image currents of the overlapping frequencies produced by the ions. The resulting signals representing the abundance of ions are indicated diagrammatically at 30 in FIG. 1. Although FIG. 1 diagrammatically illustrates the daughter ions on paths 24 to 28 as being separated spatially, it will be understood that the paths in fact are separated in time, not space.

The accumulation of these mass yields for the initially selected primary ions 16, 17 and 18 completes a first cycle of measurement. This cycle is repeated for a second, different mass-selected combination of primary ions selected from the mixture 12, which may result in a different set of daughter ions after dissociation. In each succeeding cycle, a different 50% of the ions present in the sample 12 are selected by the mass spectrometer stage 14, are dissociated and are mass separated to obtain corresponding abundances of secondary ions. In accordance with the teaching of the aforesaid '869 application, measurements are made for the same number of cycles as there are ions in sample 12. Thus, for example, if there are 11 different ions in the sample, 11 measurement cycles are performed to obtain 11 different sets of mass yields. The result of these measurements are 11 simultaneous equations for each mass value in the MS-II spectrum, the 11 unknowns for a given mass value representing the abundance of that mass in the MS-II spectrum of each of the precursor ions. These equations can be solved through Hadamard transforms.

In a test, the system of FIG. 1 was used with an 11-component synthetic mixture illustrated in the following Table 1:

TABLE I (Eleven component mixture)

| | Compound | $M^+$, m/z | Most abundant CAD ions, m/z |
|---|---|---|---|
| 1. | thiophene | 84 | 58, 45 |
| 2 | cyclohexanone | 98 | 55, 79, 41, 69, 43 |
| 3. | 1,2-dimethylbenzene | 106 | 91, 65 |
| 4. | 3-methylanisole | 122 | 91, 92, 77, 107, 79, 121 |
| 5. | 2-methoxyphenol | 124 | 109, 81, 53, 77 |
| 6. | n-butylbenzene | 134 | 91, 92 |
| 7. | 1-fluoro-4-nitrobenzene | 141 | 83, 30, 111, 95, 57, 75 |
| 8. | 2-fluorobenzotrifluoride | 164 | 114, 145, 163, 83 |
| 9. | 1-bromo-4-fluorobenzene | 174 | 95, 75 |
| 10. | 1,2,4-trichlorobenzene | 180 | 145, 109 |
| 11. | 4-bromoanisole | 186 | 171, 143, 79, 77, 107, 156 |

All of the foregoing compounds were obtained commercially, and used without further purification. The spectrometer used in the test was a Nicolet FTMS-2000 with a 3T magnet, used in its dual cell configuration (S. Ghaderi et al, *Adv. Mass Spectrom* 1986, 10, p. 875). For the simultaneous collection of the MS-II spectra of the 11 molecular ions (those representing the most abundant isotopic compositions), the mixture 12 was introduced in the source side of the FTMS at a pressure of $10^{-6}$ torr and ionized with 20 eV electrons. To obtain the spectra representing 11 different Hadamard combinations, each including six molecular ions, the source ions were transferred to the analyzer side ($10^{-9}$ torr) of the dual cell FTMS device. For each cycle, a Hadamard "mask" was applied, wherein different combinations of six molecular ions were obtained and five ions were discarded, using SWIFT excitation. Fragment ions were also discarded using three additional SWIFT waveforms, leaving the six selected precursors isolated in the FTMS cell (MS-I). These ions were simultaneously excited to about 25 eV kinetic energy with a single SWIFT waveform containing frequencies for all 11 precursors, and the ions so excited (illustrated by paths 16, 17 and 18) were then dissociated, as indicated at the CAD reaction 20 in FIG. 1, as by the use of $N_2$ collision gas introduced into the cell by way of a set of pulsed valves. After a 500 ms reaction time, the resulting daughter ions were mass separated at 22 into corresponding paths through the use of broad band SWIFT excitation and were then detected using the Fourier transform. The detector had 32K data points and utilized 50 signal averaged scans.

Since the spectra so obtained can include noise signals due to the presence of materials other than the 11 components of the mixture being tested, a blank spectrum was obtained from the apparatus of FIG. 1 in the absence of an input from sample 12, and this was subtracted from the detected output to produce the combination detector signals. The abundance at each m/z value for the individual MS-II spectra was calculated from the 11 combination spectra, by simultaneously solving the resulting 11 equations for each m/z value in which all coefficients are zeros or n's, where n is the abundance (negative in sign) of each parent ion, normalized over all 11 spectra, determined from each subtracted spectra. For example, for m/z 171 the six combination spectra obtained by using 4-bromoanisole, 11, as the precursor show equal abundances, while no other combination spectra exhibit this peak; thus, solving these simultaneous equations shows that m/z 171 in the indicated abundance comes only from precursor 11.

Figure 2:
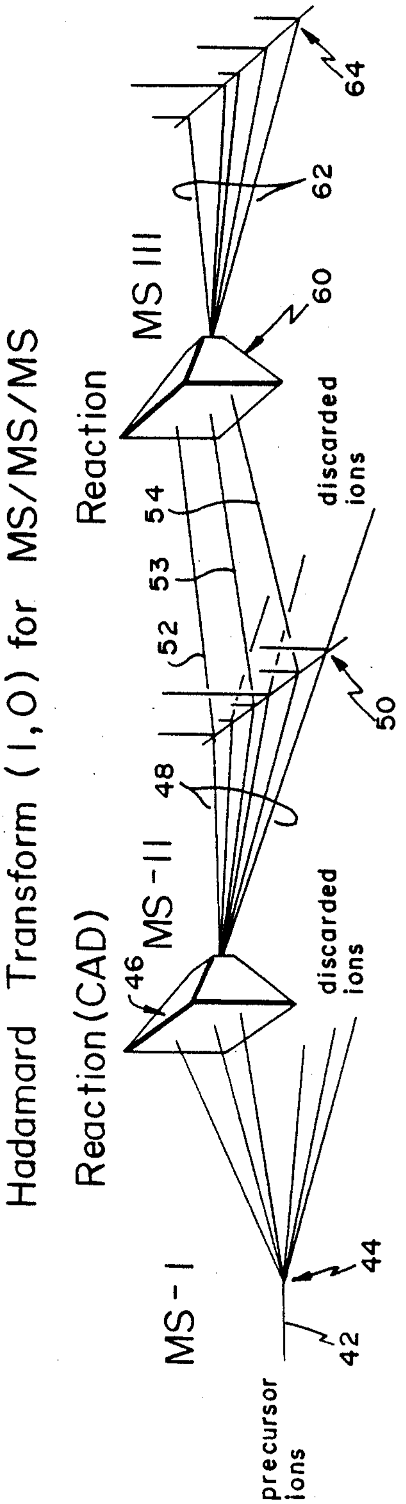
FIG. 2 (PRIOR ART)
FIG. 2 is a diagrammatic illustration of a three-stage (MS-III) method of sample analysis using the Hadamard transform.

Although FIG. 1 illustrates a two-stage mass separation process, it may in some circumstances be desirable to further break down the daughter ions in a third stage dissociation and mass separation. Such a further MS-III (or $MS^3$) stage produces "granddaughter" ions which are then analyzed in the manner described above. The simultaneous collection of nine $MS^3$ (granddaughter) spectra for three daughter ions of three precursors is illustrated in FIG. 2, where precursor molecular ions of 1-propen-3-ol (m/z 58), n-butanal (m/z 72), and n-hexane (m/z 86) were supplied to the FTMS 40 at input 42, were isolated at 44 and dissociated at CAD 46. Daughter ions, indicated by paths 48, were mass separated, as illustrated at 50, selecting out ions at m/z 29 ($C_2H_5^+$, $CHO^+$), m/z 43 ($C_3H_7^+$, $C_2H_3O^+$) and m/z 57 ($C_4H_9^+$, $C_3H_5O^+$) on paths 52, 53 and 54. These ions were again dissociated at CAD 60 to produce complete granddaughter (MS-III) spectra at paths 62. Hadamard masks were applied in both MS-I and MS-II stages by ejecting one molecular and one daughter ion prior to ion isolation. The remaining ions were dissociated simultaneously in each MS stage by CAD at 46 and 60 using pulsed $N_2$ collision gas. This was repeated for the 9 possible ejection combinations representing the 9 dissociation pathways (e.g. n-hexane→$C_4H_9^+$→granddaughters). The abundances at each m/z value for the individual MS-III spectra from each of these pathways were calculated from the resulting 9 simultaneous equations produced at the outputs represented at 64.

Figure 3:
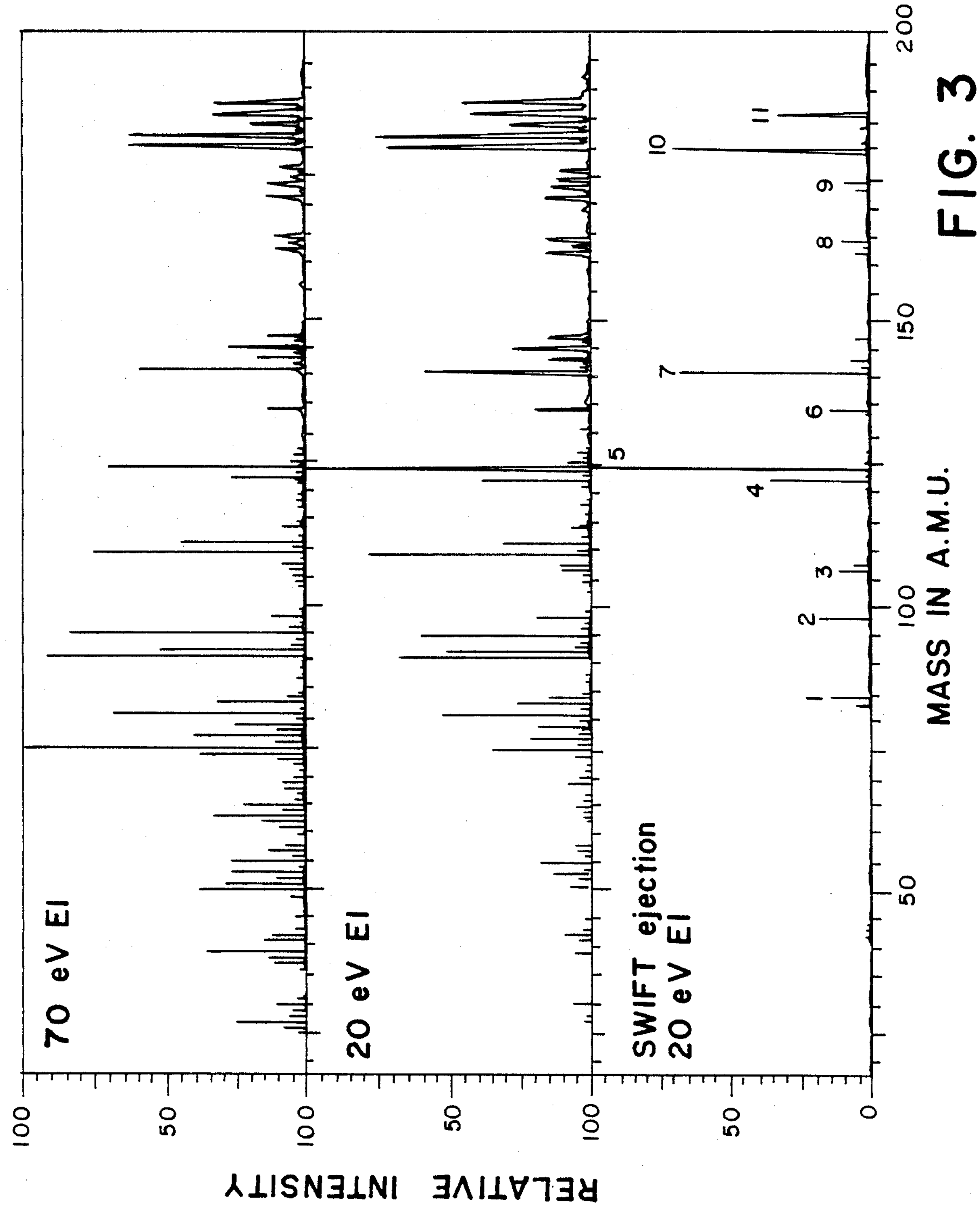
FIG. 3 is a graphical illustration of the mass spectra of the 11-component mixture of Table I, utilizing 70 eV EI for the top graph, 20 eV EI for the middle graph, and 20 eV EI after SWIFT ejection for the bottom graph.

In the multistage FTMS methods of FIGS. i and 2, the presence of any ions other than the chosen precursors for the CAD step was found to interfere seriously with daughter ion measurements. To minimize this problem, the FTMS cell pressure was kept low to avoid ion-molecule reactions, and the electron ionization energy was decreased to 20 eV to increase the relative abundances of molecular ions. To maximize the elimination of non-precursor ions, the excitation by SWIFT appears ideal; the designated precursors retain a low kinetic energy and remain in the FTMS cell. FIG. 3 illustrates this for the molecular ions from the 11 component mixture. With the SWIFT unit used, some ions other than the chosen precursors remained; these apparently represent ionic products of precursor CAD resulting from residual excitation. These did not appear to be due to incomplete ejection, as they were not decreased by increased excitation power. To remove these signals a "blank" spectrum is also measured for each precursor set under the same conditions, but without precursor excitation. Subtraction of its blank from each spectrum effectively eliminates this background problem.

Figure 4:
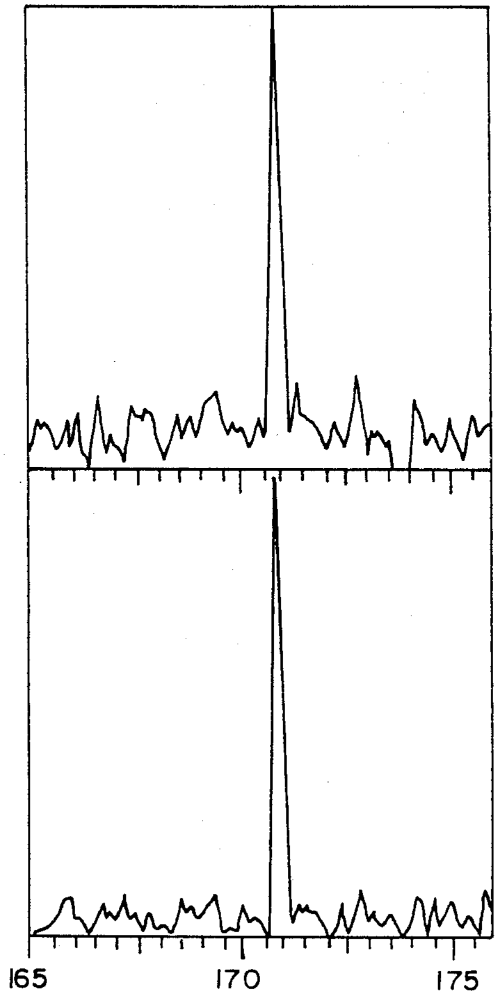
FIG. 4 is a graphical illustration of the spectra for a daughter ion at m/z 171 (loss of $CH_3$) from component 11, the top graph representing a single measurement and the bottom graph representing measurement after Hadamard transform, showing a s/n improvement of 2.0x.

Hadamard transformation of the 11 combination spectra gave individual CAD spectra for each of the 11 precursors; all showed improved signal-to-noise ratios (S/N). For example, m/z 45 and 58 from precursor 1, and 143 and 171 (FIG. 4) from 11, show an actual S/N improvement of 1.7, 1.8, 2.0 and 2.0 versus the same peaks in a single combination spectrum. Because the products from each precursor are measured six times in the eleven spectra, while for these spectra the random noise is averaged, an enhancement of $6/(11)^{0.5}=1.8$ is obtained or exceeded. This corresponds to a time savings of 3.3× versus obtaining spectra of comparable S/N by individual measurement. For p precursors, the S/N enhancement should be $p^{0.5}/2$ (for large p; division by 2 because half the precursors are discarded), or a time savings of 4/p.

The individual spectra initially obtained by Hadamard transformation, despite the careful selection of precursor ions, may still contain peaks not from the precursor. These represent incomplete elimination ("cross-talk") of both fragment and precursor ions from other mixture components. By varying the SWIFT waveform used to excite each set of six precursors, a substantial reduction in cross-talk may be achieved, using the same CAD excitation waveform for each combination spectrum (frequencies for all 11 precursors applied with only 6 present). This minimizes variations in the degree of excitation; such variations in product abundances that are proportional to the precursor intensity should be expected to result in cross-talk. Successful application of the Hadamard transform method requires that the variations in measured peak abundances be random noise limited, a condition met by EI ionization as well as FTMS detection.

Even with these improvements, the Hadamard transformed MS-II spectrum of cyclohexanone (FIG. 5, top) shows cross-talk ions at m/z 124 and 141 from precursors 5 and 7, respectively, as well as fragment ions at m/z 91 and 92 from 4 and/or 6, m/z 95 from 7 and/or 9, and m/z 145 from 10. As another possible source of product abundance variation dependent on precursor ion intensity, the pressure and concentration of mixture components in the inlet system were observed to vary by as much as 85% over the course of the measurements. To correct for these changes, the actual abundance values for each precursor in each MS-II spectrum, as shown in the blank spectrum, were used as coefficients (i) in each of the eleven simultaneous equations ($0.82 \leqq i \leqq 1$). This substantially reduced, but did not remove, the appearance of cross-talk ions in the Hadamard transformed spectra.

Figure 5:
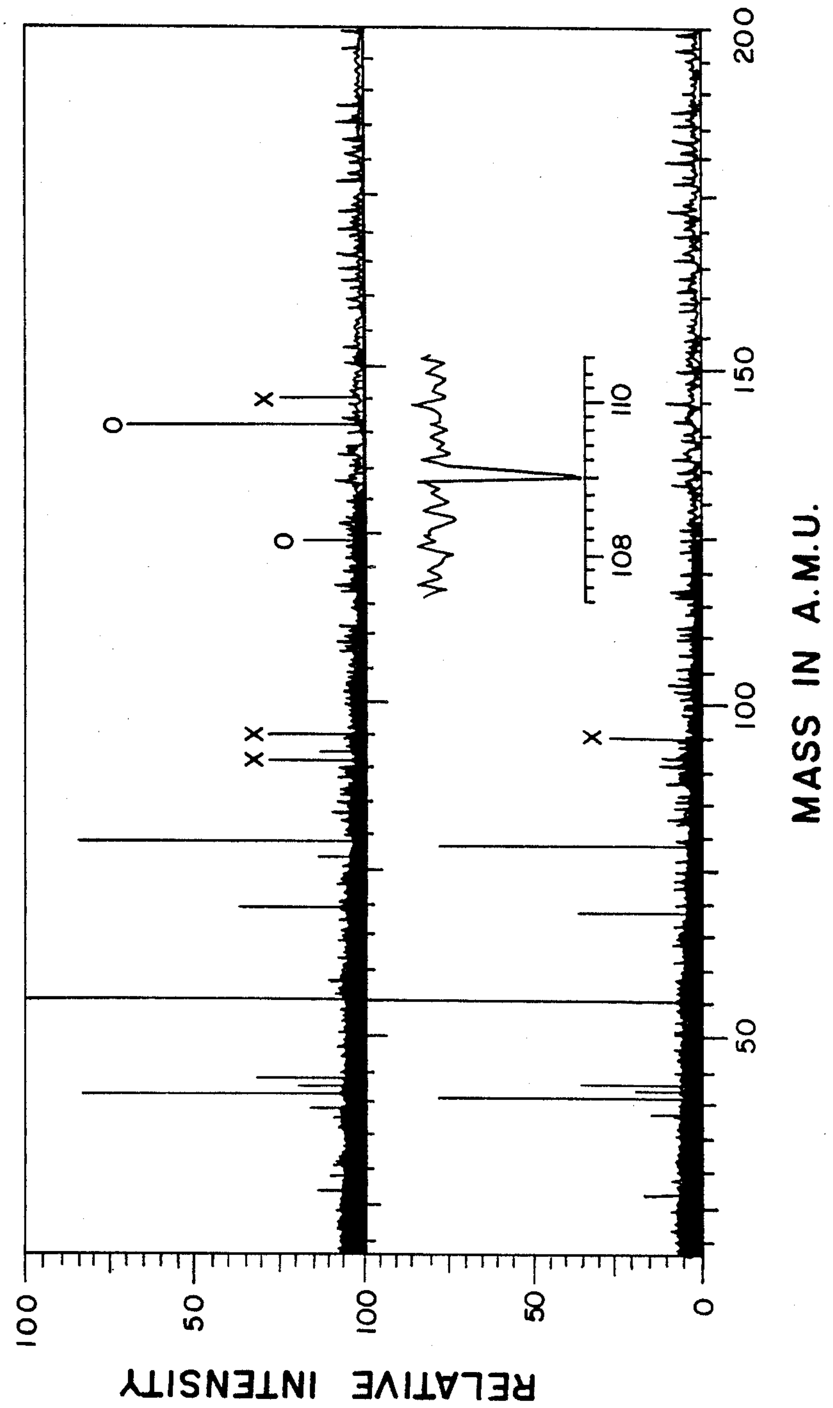
FIG. 5 is a graphical illustration of Hadamard 15 transformed CAD spectra of component 2 (about 63% dissociation efficiency) using equation coefficients of zeros and ones (top graph) and modified equation coefficients (bottom graph, with an inset graph showing a negative peak, abundance 38% of that of the base peak), wherein O represents other precursor ions and X represents fragment peaks from other precursors.
Figure 6:
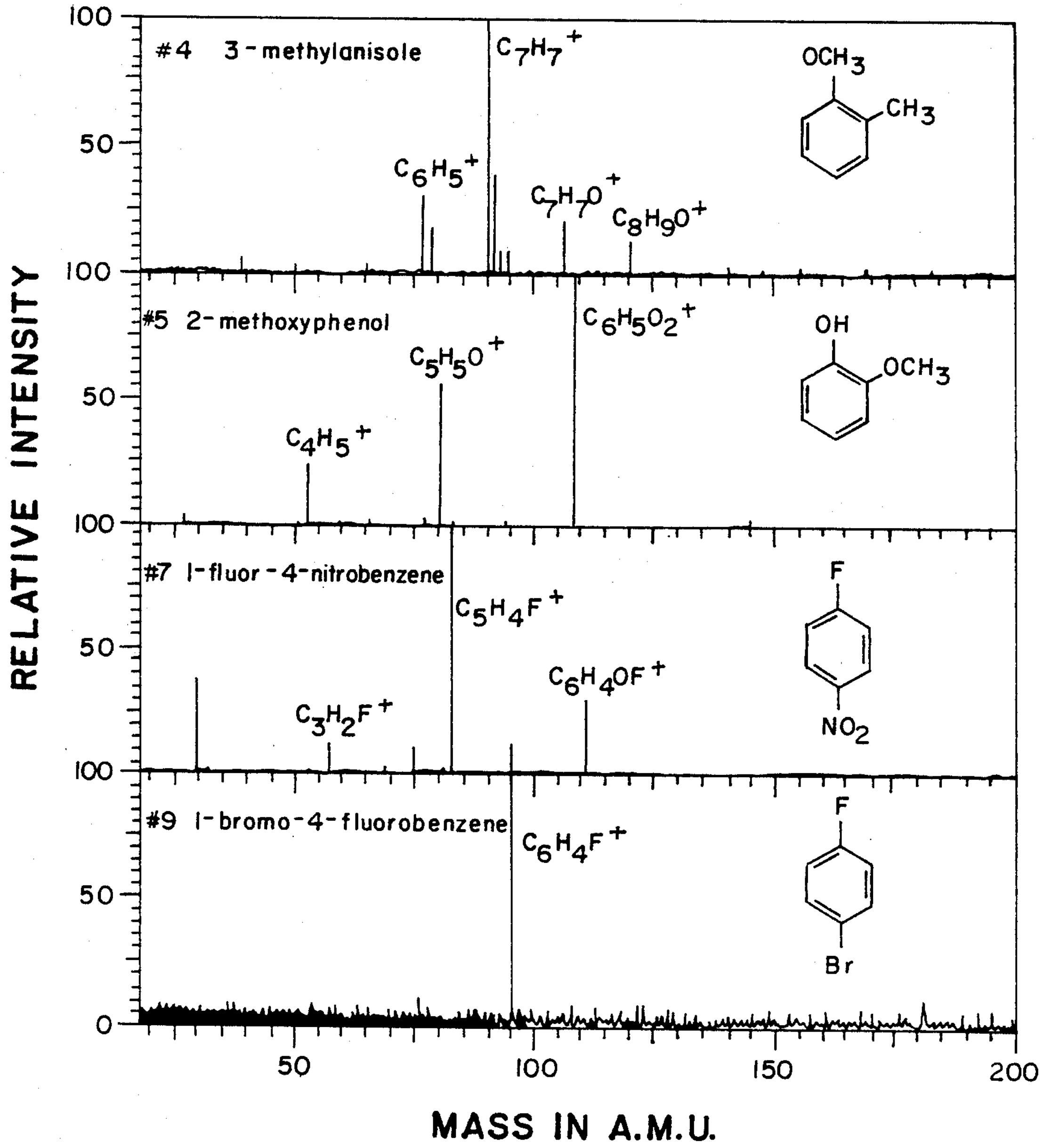
FIG. 6 is a graphical illustration of typical Hadamard transformed CAD spectra, with precursors being components 4, 5, 7 and 9 (top to bottom), with dissociation efficiencies of 80%, 48%, 59% and 29%, respectively.

Yet another possible source of product yield fluctuations proportional to precursor intensity is variation in dissociation efficiency due to irreproducibility in gas introduction from the pulsed vales, for static gas CAD gives much lower sensitivity. The magnitude of the collisional dissociation (amount of precursor dissociated) is actually indicated by the resulting reduction in precursor ion abundance, i.e., the difference between its value in the blank and in the MS-II CAD spectrum. Using this difference as the equation coefficient i and recalculating gives Hadamard transform (HT) spectra of which seven (e.g., FIG. 6) show virtually no significant (10% base peak) anomalous peaks, and these are greatly reduced in the other four spectra (FIG. 5, bottom). This method does not correct for changes in the relative abundance of fragments that can occur with variations in collision gas pressure, and this may be a source of the remaining anomalous peaks.

Using these difference i values can introduce artifacts, however. This artificially removes peaks corresponding to the precursor masses from all spectra; fragment ions corresponding to these masses, which are not significant in these 11 spectra, would improperly weight the combination spectrum and would not be detected. On the other hand, the remaining cross-talk peaks each appear to be accompanied by a complementary cross-talk peak of negative abundance in other HT spectra. The largest such negative peak observed, a fragment peak of 5 and 10 at m/z 95 fragment peak from both 7 and 9 appears as positive and negative cross-talk peaks in HT spectra 1, 2, 6, 10 and 3, 5, 8, 11, respectively.

Figure 7:
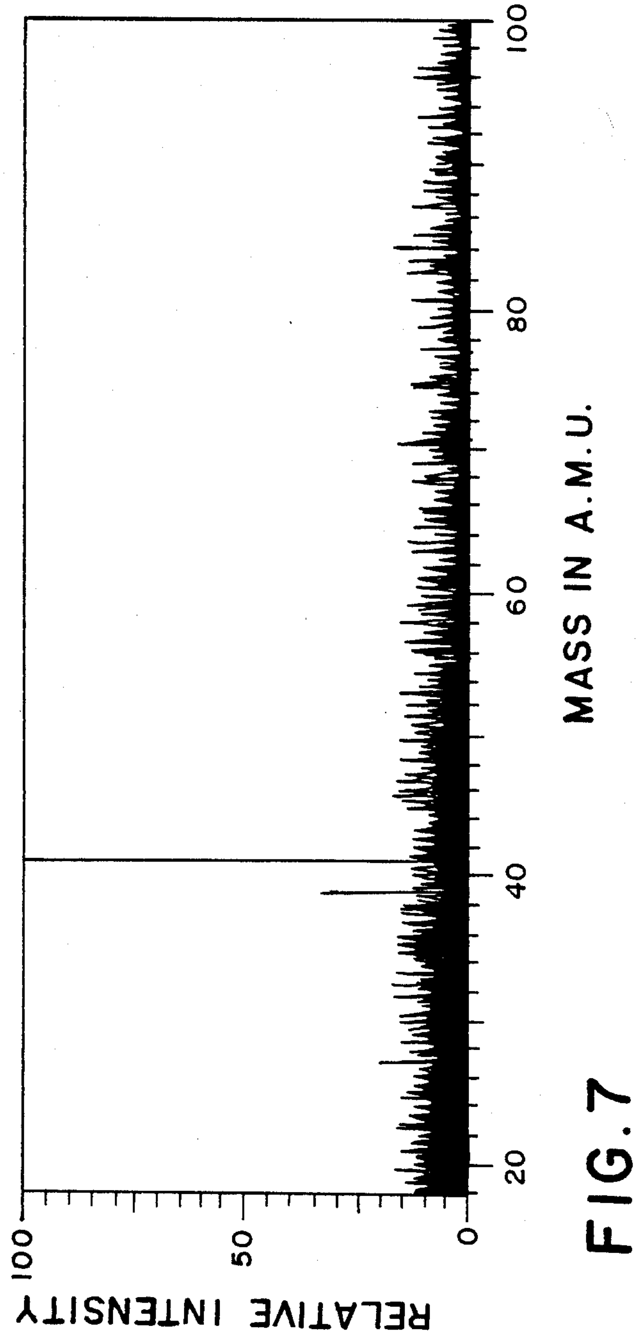
FIG. 7 is a graphical illustration of a two-dimensional Hadamard transform MS/MS/MS spectrum of n-hexane ($C_6H_{14}^+$)→m/z 57 ($C_4J_9^+$) m/z 41 ($C_3H_5^+$) and m/z 39 ($C_3H_3^+$)

For MS/MS/MS, the above approach would apply also for measuring the combined MS-III spectra of multiple daughters formed from a single precursor ion. If such spectra are desired for multiple daughters of several precursors, two independent Hadamard masks can be applied to the p precursors and d daughters to obtain (p·d) combination MS-III spectra. As discussed above with respect to FIG. 2, this was tested with three precursors and three daughters, whose nine possible dissociation pathways will produce nine MS-III spectra; that for hexane$^{+.}\rightarrow$m/z 57$^{+}\rightarrow$ products is shown in FIG. 7. Because half of the daughter ions as well as half of the precursors are discarded to encode the MS/MS/MS pathway information, and because the value of n was so small, in this test, the expected S/N enhancement, $(2/3^{0.5})^2=1.3\times$ (observed 1.1×), was only marginally useful; basic signal levels were also poor in this $MS^3$ experiment. However, the expected m/z 39 and 41 peaks, although not the weaker 27 and 29 peaks, were observed.

With computer automation, it will be possible to extend the foregoing approach to larger numbers of precursors and daughters, and even to n dimensions by applying a Hadamard mask in each stage of MS. Each stage increases exponentially the number of possible pathways in $MS^n$ experiments, which should make the Hadamard method even more valuable, although each additional stage also halves the precursor abundance yielding the $MS^n$ data. In general, for p precursors and $d_{(n-2)}$ intermediate daughters, a S/N enhancement of $(p \cdot d_1 \ldots d_{(n-2)})^{0.5}/2^{(n-1)}$ will be obtained, which corresponds to a time savings of $2^{2(n-1)}/p \cdot d_1 \ldots d_{(n-2)}$. For example, complete MS-III information from 20 parents and 40 daughters can be obtained in 1/50 the time required for measuring them individually.

Figure 8:
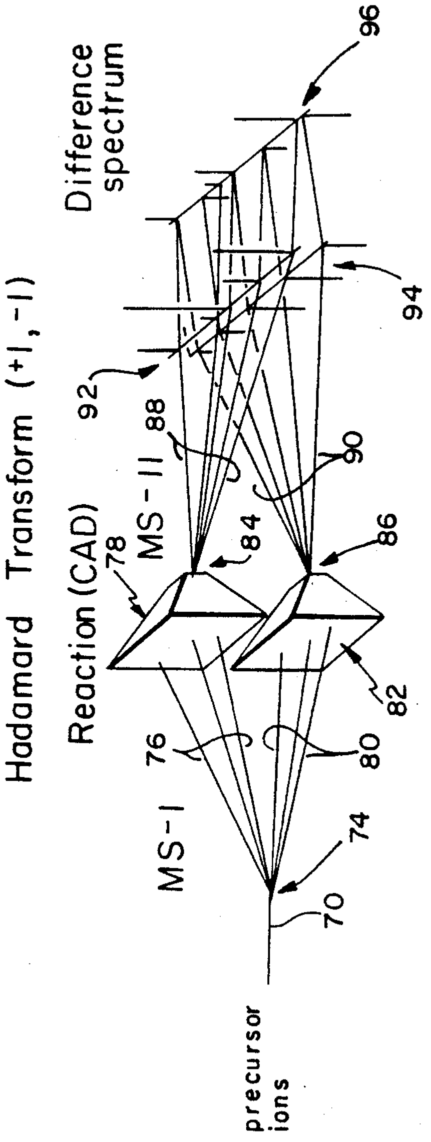
FIG. 8 is a diagrammatic illustration of an improved two-stage (MS-II) method of sample analysis using the Hadamard of differences method of the present invention.

As has been discussed above, the system of FIG. 1 has the disadvantage that approximately half of the precursor ions are discarded with each cycle of measurement, thus requiring a relatively large sample in order to obtain an accurate analysis of the sample. In accordance with the present invention, a Hadamard of differences method is used to avoid the loss of ions during the foregoing FTMS selection process. Accordingly, as illustrated in FIG. 8, a sample 70 of material to be analyzed is supplied to a dual cell FTMS unit generally indicated at 72, where half of the precursor mass values are selected at 74 (as described for FIG. 1) and follow paths 76 to CAD 78. The remaining mass values, instead of being discarded, follow paths 80 to a second CAD 82. This may be accomplished by means of a ring electrode provided around the conductance limit opening between the two cells of unit 72 so that half the precursor mass values are selectively excited to orbits large enough to keep them trapped by the first cell end plate outside the ring electrode, while the remaining precursors are selectively transferred to the second cell by momentarily grounding the electrode. The precursors in the first cell are then collisionally relaxed back to the cell center, for example, by applying a voltage pulse to all excite and receive (X,Y) plates, followed by collisional relaxation of the resulting Z-axis excitation. This results in precursor ions in both cells of unit 72, indicated by paths 76 and 80, and these selected ions are supplied, as illustrated by paths 76 and 80, respectively, for collisionally activated dissociation as illustrated at 78 and 82, respectively. Although the CAD step is illustrated in FIG. 8 as being distinct from the dual cell FTMS unit, it will be understood that such dissociation is produced in the unit 42; the illustration in FIG. 8 is for convenience in illustrating the time-sequenced steps being followed.

After the CAD step the daughter ions are mass separated by the FTMS 72 as indicated at 84 and 86, with the ions produced by CAD 78 and 82 following the paths generally indicated at 88 and 90, respectively. In accordance with the Hadamard of difference technique, daughter ion measurement is of the whole spectrum, using the original FTMS, but with the ion measurement for the two cells indicated diagrammatically at 92 and 94 using excitation waveforms shifted in phase 180°. The phase shift may 15 be accomplished electronically, or may be obtained by reversing the electrical connections to the excitation plates of one or the other of the FTMS cells. Daughter ions in the two cells, indicated by paths 88 and 90, are detected simultaneously by measurement of the spectrum at 96, but the resulting signal for a particular m/z value represents the difference (+ or −) between the abundances of that value in the two cells. As a result of this phase shift encoding of the signals representing the daughter ions, none of the ions from sample 70 need be discarded. Furthermore, the noise in such measurements does not increase appreciably.

The calculations for carrying out the method described above for the Hadamard of differences may be described in general terms as follows:

The number of parent ions is best chosen to be (4*i) where i is an integer. This is because the matrices that are used to multiplex the ions do not exist for all values of n. Once n has been chosen, the n x n matrix (called an 'H' matrix) must be determined. For example, the H matrix for 8 parent ions is:

| | | | | | | | | |
|---|---|---|---|---|---|---|---|---|
| H = | 1 | 1 | 1 | 1 | 1 | 1 | 1 | 1 |
| | 1 | −1 | −1 | −1 | 1 | −1 | 1 | 1 |
| | 1 | −1 | −1 | 1 | −1 | 1 | 1 | −1 |
| | 1 | −1 | 1 | −1 | 1 | 1 | −1 | −1 |
| | 1 | 1 | −1 | 1 | 1 | −1 | −1 | −1 |
| | 1 | −1 | 1 | 1 | −1 | −1 | −1 | 1 |
| | 1 | 1 | 1 | −1 | −1 | −1 | 1 | −1 |
| | 1 | 1 | −1 | −1 | −1 | 1 | −1 | 1 |

Each row of the H matrix corresponds to a combination of parent ions to be dissociated and measured. The 1 designates an ion to be dissociated on one side of the cell, −1 designates a parent ion to be dissociated on the other. In this case, the daughter spectra of 8 parent ions are measured by selecting 8 different combinations of 4 parent ions to be dissociated in each cell.

A measurement (M) is then:

$$M(n) = H(n,n)*T(n) + E(n)$$

where T is the 'true' value and E is the random error associated with a measurement.

To unmultiplex the measurements, multiply M by the inverted H matrix:

$$U(n) = H^{-1}(n,n)\ M(n)$$

The H matrix can be calculated from the corresponding $(n-1)\times(n-1)$ 'S' matrix by:

1. Replacing each 1 and 0 in the S matrix with −1 and 1 respectively
2. Adding both a first row and first column of ones to produce the $n\times n$ H matrix. For example, the previous $8\times 8$ H matrix was generated from the following $7\times 7$ 'S' matrix;

| | | | | | | | |
|---|---|---|---|---|---|---|---|
| S = | 1 | 1 | 1 | 0 | 1 | 0 | 0 |
| | 1 | 1 | 0 | 1 | 0 | 0 | 1 |
| | 1 | 0 | 1 | 0 | 0 | 1 | 1 |
| | 0 | 1 | 0 | 0 | 1 | 1 | 1 |
| | 1 | 0 | 0 | 1 | 1 | 1 | 0 |
| | 0 | 0 | 1 | 1 | 1 | 0 | 1 |
| | 0 | 1 | 1 | 1 | 0 | 1 | 0 |

A Fortran program for generating the first row elements of the S matrix takes the following form, it being noted that S matrices are simplest to generate and use if they are cyclic; that is, row k is row k-1 shifted by one position.

```
c       < generate the first row of a cyclic S matrix by
c       the quadratic resude method >
        program generate_s
c       < this must be an allowed S matrix dimension,
        and c a prime number >
        parameter (N = 7)
        integer num(l00)
        integer first_row(N)
c       < generate the numbers 1,4,9 . . . ((N-1)/2**2 >
        do i = 1, (N-1)/2
        num(i) = mod(numIi),N)
        end do
c       < generate the first row elements of S >
        first_row(1) = 1
        do i = 1, N
        first_row(num(i) + 1) = 1
        end do
```

-continued

```
      write (*,9000) first_row
 9000 format (10i3)
      end
```

A Fortran program for inverting an H matrix takes the following form:

```
c     < invert an H matrix >
      subroutine invert_h(h,n)
      real h(n,n)
c     < transpose H >
      do     100 i = 1, n
      do     100 j = 1, i
             temp = h(i,j)
             h(i,j) = h(j,i)
             h(j,i) = temp
100   continue
      do     i = 1, n
             write (*,*) (h(i,ii),ii = 1,n)
      end do
      do     110 i = 1 , n
      do     110 j = 1 , n
             if (h(i,j) .eq. 1) then
             h(i,j) = 1./n
      else
             h(i,j) = -1./n
      endif
110   continue
      end
```

The Hadamard transform can be carried out with the following program:
This is a 'slow' transform - a simple $O(n^2)$ matrix multiplication. There is a FHT[2] which calculates a Hadamard trnasform $0(n\log(n)+2n)$, which will speed up the transform for large n.

```
parameter (N = 7)
real inverse_h(N,N)
real m(n) ! measured values
real u(n) ! solved values
.
.
.
do i = 1 , N
   sum = 0.
   do j = 1 , N
   sum = sum + inverse_H(i,J) * m(j)
   end do
   u(i) = sum
end do
.
.
.
```

A simplified method may be used in the case where precursor and daughter ions have similar m/z values, as may occur with electrospray ionization. In such ionization, if a linear precursor has, for example, 100 evenly spaced charges, a random fragmentation will produce daughter ions of nearly the m/z value of the precursor. In this case, the two selected sets of precursors are simultaneously excited, but with opposite phase, and are dissociated immediately, as by photodissociation, so that daughters of the two sets will be formed on opposite sides of the FTMS cell. The product ions would then continue in orbit with their characteristic frequencies. If quadrature detection of those product ions is used, then ions of a particular frequency (and m/z value) from the two sets of product ions would make amplitude contributions to the detector output of opposite sign. This technique can also be used in an expanded MS/MS/MS system, such as that illustrated in FIG. 9, without discarding precursor or daughter ions, although in this case, 90° phase offsets would be used instead of 180° shifts. In theory, MS-2 spectra of 100 precursors could be collected in 1/100th the time and with the 1/100th the sample required for individual measurements. Similarly, 100 $MS^3$ spectra obtained from dissociating from 10 daughters of 10 precursors could also be collected in 1/100th the time.

Figure 9:
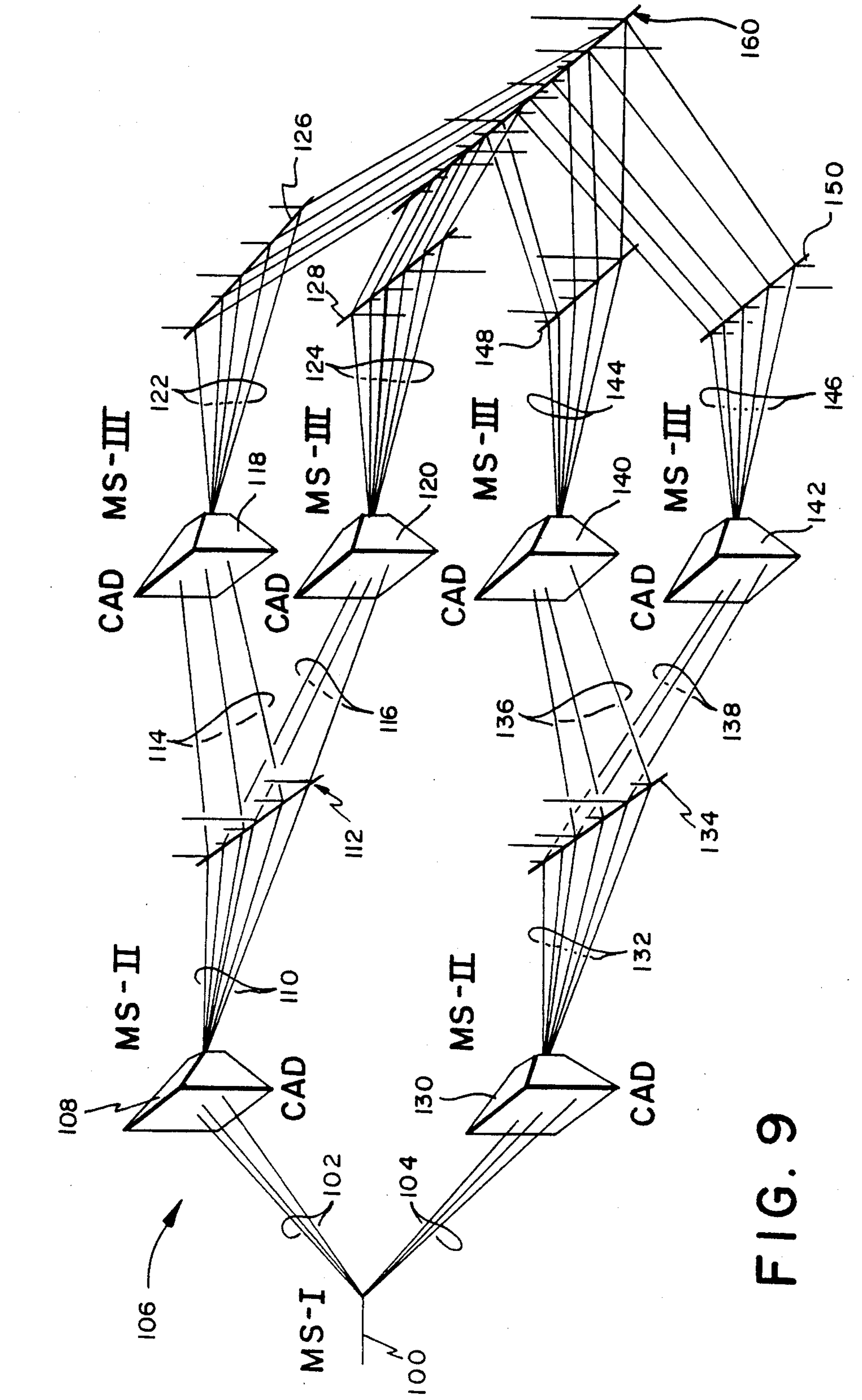
FIG. 9 is a diagrammatic illustration of a four-stage (MS-III method using the Hadamard of differences method.

The $MS^3$ system illustrated in FIG. 9 is a combination of the systems of FIGS. 2 and 8, and thus illustrates at MS-1 the mass selection from ion source 100, containing n primary ions, of two sets of precursor ions 102 and 104 in an FTMS device 106. Each set of precursor ions includes approximately 0.5n ions. The set 102 of 0.5n precursor ions is dissociated at CAD 108 and the resulting daughter ions 110 are mass-selected as illustrated at 112. If d daughter ions are produced, the mass-selection at 112 divides them into two sets 114 and 116, each consisting of approximately 0.5d daughter ions. The daughter sets 114 and 116 are dissociated at CADs 118 and 120, respectively, to produce granddaughter ions 122 and 124, respectively. These are mass-separated for measurement of their mass spectra at 126 and 128, respectively. The granddaughter ion sets 122 and 124 are excited by waveforms of opposite phase (i.e., shifted by 180°) for mass separation, so that their spectra 126 and 128 are opposite; i.e., 126 is a positive signal and 128 is a negative signal.

In similar manner, the precursor ions in set 104 are dissociated at CAD 130 to produce daughter ions 132 which are mass separated at 134 to provide two additional sets 136 and 138 of daughter ions. If d' daughter ions are produced at CAD 130, the mass selection at 134 provides two sets 136 and 138 consisting of approximately 0.5d' daughter ions each. The sets 136 and 138 are further dissociated at CAD 140 and CAD 142, respectively, to produce granddaughter ions 144 and 146, respectively. These are mass separated at 148 and 150 for measurement of their mass spectra. As was the case with the granddaughter ions 122 and 124, the ion sets 144 and 146 are excited by waveforms which are 180° out of phase with each other so that 148 is positive and 150 is negative. In the four-cell implementation of FIG. 9, the spectra 126, 128, 148 and 150 can be measured simultaneously, as illustrated at 160, to obtain a combination difference spectrum. Alternatively, two sets of spectra 126, 128 and 148, 150 can be added to produce a pair of composite spectra, and those two composites added to produce the single combination spectrum. The advantage of collecting all four outputs 126, 128, 148 and 150 and adding them once is that the noise is measured only once.

Figure 10:
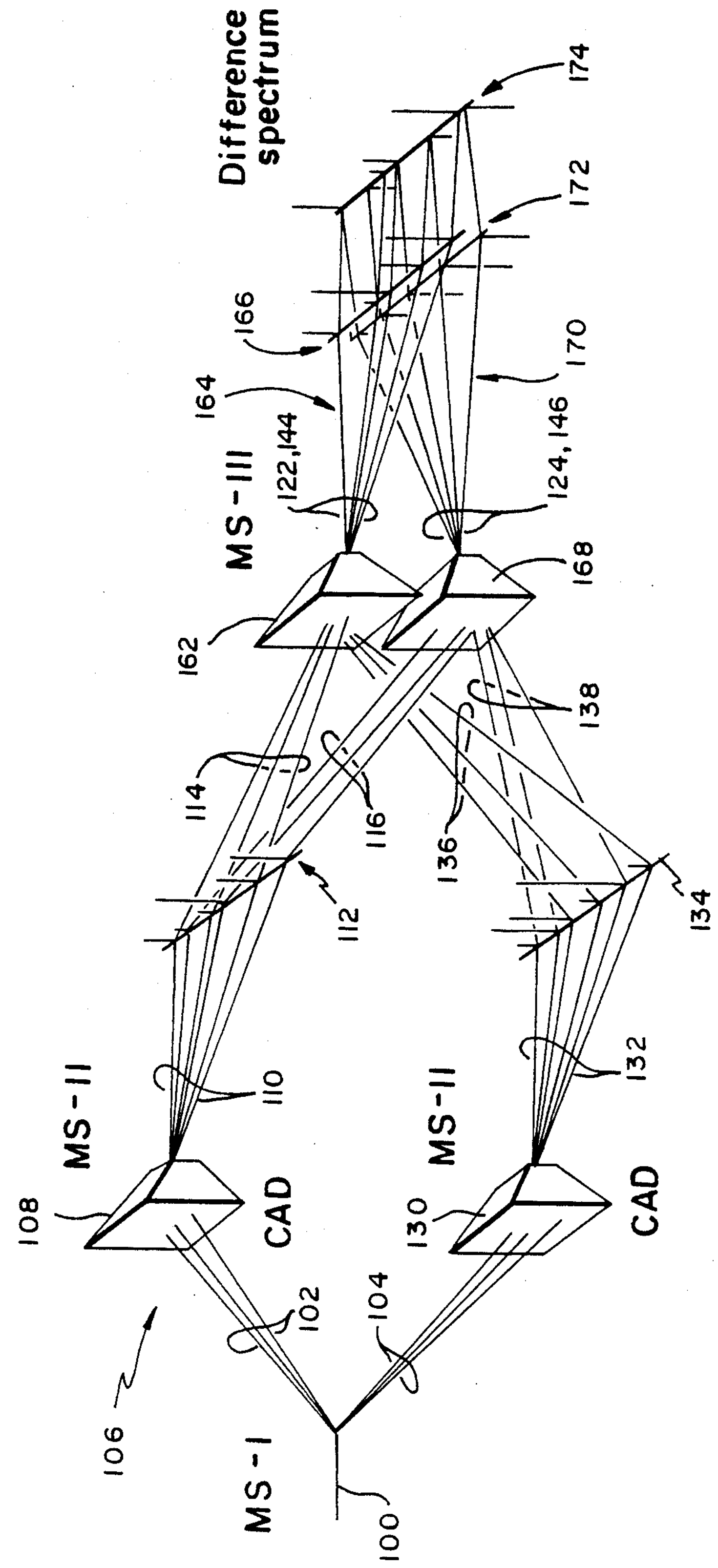
FIG. 10 is a diagrammatic illustration of a dual-stage MS-III method using the Hadamard of differences method.

MS-III measurements can also be implemented in a dual cell FTMS instead of the four-cell device of FIG. 9, and this dual-cell arrangement is illustrated in FIG. 10. In this figure, the ion precursor sets 102 and 104 are dissociated at CAD devices 108 and 130 and their respective daughter ions 110 and 132 are mass-selected at 112 and 134, as described with respect to FIG. 9. In the configuration of FIG. 10, phase shifts are not required to obtain a composite spectrum of the dissociated and mass-separated ions. Instead, the daughter ions on path 114 and the daughter ions on path 136 are combined in a common path and are commonly reacted in a CAD 162 for mass separation to provide a combined output 163 of granddaughter ions 122 and 144. The combined ions are then measured to provide a positive combined spectrum 166. In similar manner, the daughter ions on paths 116 and 138 are combined at CAD reactor 168 and are mass separated along the path 170. The path 170 includes the combined granddaughter ions 124, 146 which are measured to provide a negative spectrum 172. The positive and negative spectra 166 and 172 of the ions on paths 164 and 170 are then combined, as at 174, to produce a difference spectrum. This may be accomplished by collisionally cooling Z-axis ion energy, exciting ions along paths 114 and 138 to a larger orbit in the FTMS, and then momentarily grounding the ring electrode so that the remaining ions in each cell are transferred to their adjacent cells. The time required for this transfer is mass dependent, since lower mass ions move faster than higher mass ions, so that daughter ions of similar m/z ratios may be transfered together in a single pulse. Daughter ions over a wider mass range can be more efficiently transferred by forming a z-axis potential well, which "parks" the ions near the conductance limit on both sides of a dual cell, as by using higher trapping potentials on both the front and back trapping plates of the FTMS. Ions are then transferred by momentarily grounding the ring electrode, while simultaneously returning the front and back trapping potentials to normal values. The flight times required to transfer ions to adjacent cells are then comparable for all ions, and the small, faster ions would simply penetrate further into the cell.

The foregoing process is repeated d times to select different combinations of daughter ions for dissociation at MS-III, and the resulting spectra are measured. This is done n times for each possible combination of precursor ions for the two sets 102 and 104, so that the Hadamard transform of each set of spectra at 126, 128, 148 and 150 produces n x d simultaneous equations, from which the abundance of specific granddaughter ions can be determined.

Thus, there has been disclosed an improved method for analysis of molecular samples utilizing the simultaneous collection of multiple spectra using tandem (MS/MS) and multidimensional (MS/MS/MS) mass spectrometry to yield enhanced sensitivity. Hadamard transform deconvolution is utilized and the method takes advantage of the multichannel dissociation capability of Fourier-transform mass spectrometry (FTMS). Hadamard transformation yields individual spectra of the precursor ions exhibiting a signal-to-noise ratio improvement over spectra measured separately. No ions are lost in the present method, for the combined daughter spectrum of the selected half of the precursors is subtracted from the spectrum of the other half of the precursors. The method is generally applicable to any mass spectrometer capable of selecting and dissociating multiple precursors and analyzing their products. Further, additional stages of spectrometry can be used to further break down the ions being detected. Although the present invention has been disclosed in terms of preferred embodiments, it will be apparent to those of skill in the art that numerous modifications and variations may be made without departing from the true spirit and scope thereof, as set forth in the accompanying claims.

What is claimed is:

1. A method of analyzing molecular samples, comprising:

providing a plurality of n different primary ions in a molecular sample;

mass-selecting said n primary ions to produce first and second sets of precursor ions, each set including about 0.5n ions;

dissociating each of said first and second sets of precursor ions to form corresponding first and second sets of daughter ions;

mass-selecting said first set of daughter ions to produce a corresponding first mass-selected daughter ion set;

mass-selecting said second set of daughter ions to produce a corresponding second mass-selected daughter ion set;

measuring the abundances of said first and second sets of daughter ions and subtracting one set from the other to obtain a difference spectrum of both positive and negative abundance values;

repeating n times the step of mass-selecting said n primary ions to produce n different first and second sets of precursor ions, each having a different combination of primary ions, and for each set of precursor ions dissociating the precursor ions to produce corresponding sets of daughter ions, mass-selecting the sets of daughter ions, measuring the abundances of the first and second sets of daughter ions and subtracting one set from the other for each of the n sets of precursor ions to obtain n difference spectrums of both positive and negative abundance values for each of the mass values represented in the n different spectra, wherein the step of measuring the abundances of each of said first and second sets of daughter ions is carried out through a Hadamard of differences transform.

2. The method of claim 1, further including dissociating and mass separating each of said first and second sets of daughter ions to produce corresponding sets of granddaughter ions, wherein the step of measuring the abundances of ions comprises measuring said granddaughter ions instead of said daughter ions.

3. The method of claim 1, further including calculating from the abundance of each of said sets of daughter ions the abundance originating from each of said n precursor ions.

4. The method of claim 3, wherein the step of mass selecting said daughter ions includes selecting approximately one half said daughter ions for each of said first and second sets.

5. A method of analyzing molecular samples, comprising:

providing a sample of material to be analyzed, said sample including n different primary ions;

supplying said sample to a dual cell fourier transform mass spectrometer;

mass-selecting said primary ions in said spectrometer to produce first and second sets of precursor ions in first and second cells, respectively, of said spectrometer, each set including about 0.5n primary ions;

dissociating each of said first and second sets of said precursor ions to form corresponding first and second sets of daughter ions;

mass-selecting each of said first and second sets of daughter ions;

measuring the mass spectrum of each of said mass-selecting sets of daughter ions;

subtracting the mass spectrum of one of said sets of daughter ions from the mass spectrum of the other of said sets of daughter ions to obtain a difference spectrum; and repeating n times the steps of mass-selecting said n primary ions to produce n different first and second sets of precursor ions, each set having a different combination of primary ions, dissociating said n different first and second sets of precursor ions to produce n first and second sets of corresponding daughter ions, mass-selecting each of said n first and second sets of daughter ions, measuring the spectra of said n first and second mass-selected sets of daughter ions, and subtracting corresponding spectra of said n first and second sets of daughter ions to produce n difference spectra.

6. The method of claim 5, wherein the step of measuring the spectrum of said first and second sets of daughter ions includes first exciting said first and second sets of daughter ions in said first and second cells with excitation waveforms of opposite phase, whereby said difference spectrum represents the difference between the abundances of ions measured in said cells.

7. A method of analyzing molecular samples comprising:

providing a sample of material to be analyzed, said sample including n different primary ions;

supplying said sample to a multiple cell Fourier transform mass spectrometer for multidimensional spectrometry;

mass-selecting said primary ions in an MS-I stage of said spectrometer to produce first and second sets of precursor ions in first and second cells, respectively, of said spectrometer, each set including about 0.5 n primary ions;

dissociating each of said first and second sets of said precursor ions to produce p daughter ions in corresponding first and second sets of daughter ions;

mass-selecting each of said first and second sets of daughter ions in MS-II stages of said spectrometer to produce first and second subsets of daughter ions corresponding to said first set of daughter ions, and third and fourth subsets of daughter ions corresponding to said second set of daughter ions, each subset having approximately one half the number of daughter ions in its corresponding set;

dissociating said four subsets of daughter ions in MS-III stages of said spectrometer to produce four corresponding sets of granddaughter ions;

exciting the ions in pairs of said four sets of granddaughter ions with waveforms of opposite phase to obtain difference spectra for each pair;

measuring by a Hadamard of differences transform the mass spectra of each set of granddaughter ions and subtracting the mass spectra of the sets of granddaughter ions produced by one phase from the mass spectra of the sets of granddaughter ions produced by its opposite phase to obtain difference spectra; and repeating the measurement of difference spectra for p different combinations of daughter ions in said MS-III stage for each of n different combinations of precursor ions to provide $n \times p$ simultaneous equations.

* * * * *